(12) United States Patent
Dalmatov et al.

(10) Patent No.: US 11,144,222 B2
(45) Date of Patent: Oct. 12, 2021

(54) SYSTEM AND METHOD FOR AUTO-TIERING DATA IN A LOG-STRUCTURED FILE SYSTEM BASED ON LOGICAL SLICE READ TEMPERATURE

(71) Applicant: EMC IP Holding Company LLC, Hopkinton, MA (US)

(72) Inventors: Nickolay Dalmatov, St. Petersburg (RU); Kirill Bezugly, St. Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/882,116

(22) Filed: May 22, 2020

(65) Prior Publication Data

US 2021/0132830 A1    May 6, 2021

(30) Foreign Application Priority Data

Oct. 30, 2019    (RU) ................................ 2019134840

(51) Int. Cl.
  *G06F 3/00*    (2006.01)
  *G06F 3/06*    (2006.01)
(52) U.S. Cl.
  CPC .......... *G06F 3/0631* (2013.01); *G06F 3/0604* (2013.01); *G06F 3/067* (2013.01); *G06F 3/0653* (2013.01); *G06F 3/0685* (2013.01)

(58) Field of Classification Search
  None
  See application file for complete search history.

(56) References Cited

U.S. PATENT DOCUMENTS

| 9,274,941 | B1* | 3/2016 | Throop ................... G06F 3/061 |
| 9,959,054 | B1* | 5/2018 | Vankamamidi ......... G06F 11/34 |
| 2016/0132392 | A1* | 5/2016 | Ioannou ................ G06F 3/0673 |
| | | | 714/766 |

* cited by examiner

*Primary Examiner* — Craig S Goldschmidt
(74) *Attorney, Agent, or Firm* — Brian J. Colandreo; Mark H. Whittenberger; Holland & Knight LLP

(57) ABSTRACT

A method, computer program product, and computing system for partitioning an address space of a storage object of a log-structured file system into a plurality of slices, wherein the log-structured file system includes a plurality of storage objects in a plurality of storage tiers. One or more physical data blocks of the storage object may be allocated to each of the plurality of slices. A read temperature associated with at least one slice of the plurality of slices may be determined. A read temperature associated with each physical data block allocated to the at least one slice may be determined. At least one physical data block allocated to the at least one slice may be retiered between the plurality of storage tiers based upon, at least in part, the read temperature associated with each physical data block of the one or more physical data blocks allocated to the at least one slice.

20 Claims, 10 Drawing Sheets

SYSTEM AND METHOD FOR AUTO-TIERING DATA IN A LOG-STRUCTURED FILE SYSTEM BASED ON LOGICAL SLICE READ TEMPERATURE

RELATED APPLICATIONS

This application claims priority to Russian Patent Application No. 2019134840, filed on Oct. 30, 2019 entitled "System and Method for Auto-Tiering Data in a Log-Structured File System Based on Logical Slice Read Temperature", the contents of which is herein incorporated by reference in its entirety.

BACKGROUND

Storing and safeguarding electronic content may be beneficial in modern business and elsewhere. Accordingly, various methodologies may be employed to protect and distribute such electronic content.

Conventional auto-tiering processes typically request statistics and update I/O temperatures at a periodic basis to have a consistent picture of the I/O distribution and relocates regions at a dedicated maintenance window or by request from a user. This approach generally works well for normal file systems where regions of logical space are mapped "firmly" to some physical regions. However, log-structured file systems do not update data in the place were data is previously written, as data is buffered to blocks, packed in a segment, and then written to an empty physical space within a storage device. Accordingly, the following challenges may be observed when auto-tiering with storage devices in a log-structured file system: the logical data, which are updated constantly, are written to a new place at every update, so the "write temperature" of a physical region does not make sense as a metric to indicate frequently used storage device regions; logically adjacent data are often distributed over multiple segments that can be physically far from each other; and the segments are relatively small in size resulting in a larger number of segments, which means that tracking temperature for every segment may be not feasible.

SUMMARY OF DISCLOSURE

In one example implementation, a computer-implemented method executed on a computing device may include, but is not limited to, partitioning an address space of a storage object of a log-structured file system into a plurality of slices, wherein the log-structured file system includes a plurality of storage objects in a plurality of storage tiers. One or more physical data blocks of the storage object may be allocated to each of the plurality of slices. A read temperature associated with at least one slice of the plurality of slices may be determined. A read temperature associated with each physical data block of the one or more physical data blocks allocated to the at least one slice may be determined. At least one physical data block of the one or more physical data blocks allocated to the at least one slice may be retired between the plurality of storage tiers based upon, at least in part, the read temperature associated with each physical data block of the one or more physical data blocks allocated to the at least one slice.

One or more of the following example features may be included. Partitioning the address space of the storage object into a plurality of slices may include one or more of: aligning a size of each slice of the plurality of slices with a size of a physical data block, and dynamically aligning the size of each slice of the plurality of slices based upon, at least in part, a threshold number of slices per storage object. Determining the read temperature associated with the at least one slice of the plurality of slices may include monitoring one or more read I/O operations performed on the at least one slice. Determining the read temperature associated with each physical data block of the one or more physical data blocks allocated to the at least one slice may include dividing the read temperature associated with the at least one slice by the number of physical data blocks allocated to the at least one slice. Retiering the at least one physical data block of the one or more physical data blocks allocated to the at least one slice may include retiering a segment of physical data blocks from the storage object. Retiering the segment of physical data blocks may include one or more of: demoting the segment of blocks from a first tier to a second tier, and promoting the segment of physical data blocks from the second tier to the first tier. The first tier may include a plurality of solid state drives and the second tier may include a plurality of hard disk drives.

In another example implementation, a computer program product resides on a computer readable medium that has a plurality of instructions stored on it. When executed by a processor, the instructions cause the processor to perform operations that may include, but are not limited to, partitioning an address space of a storage object of a log-structured file system into a plurality of slices, wherein the log-structured file system includes a plurality of storage objects in a plurality of storage tiers. One or more physical data blocks of the storage object may be allocated to each of the plurality of slices. A read temperature associated with at least one slice of the plurality of slices may be determined. A read temperature associated with each physical data block of the one or more physical data blocks allocated to the at least one slice may be determined. At least one physical data block of the one or more physical data blocks allocated to the at least one slice may be retired between the plurality of storage tiers based upon, at least in part, the read temperature associated with each physical data block of the one or more physical data blocks allocated to the at least one slice.

One or more of the following example features may be included. Partitioning the address space of the storage object into a plurality of slices may include one or more of: aligning a size of each slice of the plurality of slices with a size of a physical data block, and dynamically aligning the size of each slice of the plurality of slices based upon, at least in part, a threshold number of slices per storage object. Determining the read temperature associated with the at least one slice of the plurality of slices may include monitoring one or more read I/O operations performed on the at least one slice. Determining the read temperature associated with each physical data block of the one or more physical data blocks allocated to the at least one slice may include dividing the read temperature associated with the at least one slice by the number of physical data blocks allocated to the at least one slice. Retiering the at least one physical data block of the one or more physical data blocks allocated to the at least one slice may include retiering a segment of physical data blocks from the storage object. Retiering the segment of physical data blocks may include one or more of: demoting the segment of blocks from a first tier to a second tier, and promoting the segment of physical data blocks from the second tier to the first tier. The first tier may include a plurality of solid state drives and the second tier may include a plurality of hard disk drives.

In another example implementation, a computing system includes at least one processor and at least one memory architecture coupled with the at least one processor, wherein the processor is configured to partition an address space of a storage object of a log-structured file system into a plurality of slices, wherein the log-structured file system includes a plurality of storage objects in a plurality of storage tiers. The processor may be further configured to allocate one or more physical data blocks of the storage object may be allocated to each of the plurality of slices. The processor may be further configured to determine a read temperature associated with at least one slice of the plurality of slices. The processor may be further configured to determine a read temperature associated with each physical data block of the one or more physical data blocks allocated to the at least one slice. The processor may be further configured to retier at least one physical data block of the one or more physical data blocks allocated to the at least one slice between the plurality of storage tiers based upon, at least in part, the read temperature associated with each physical data block of the one or more physical data blocks allocated to the at least one slice.

One or more of the following example features may be included. Partitioning the address space of the storage object into a plurality of slices may include one or more of: aligning a size of each slice of the plurality of slices with a size of a physical data block, and dynamically aligning the size of each slice of the plurality of slices based upon, at least in part, a threshold number of slices per storage object. Determining the read temperature associated with the at least one slice of the plurality of slices may include monitoring one or more read I/O operations performed on the at least one slice. Determining the read temperature associated with each physical data block of the one or more physical data blocks allocated to the at least one slice may include dividing the read temperature associated with the at least one slice by the number of physical data blocks allocated to the at least one slice. Retiering the at least one physical data block of the one or more physical data blocks allocated to the at least one slice may include retiering a segment of physical data blocks from the storage object. Retiering the segment of physical data blocks may include one or more of: demoting the segment of blocks from a first tier to a second tier, and promoting the segment of physical data blocks from the second tier to the first tier. The first tier may include a plurality of solid state drives and the second tier may include a plurality of hard disk drives.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
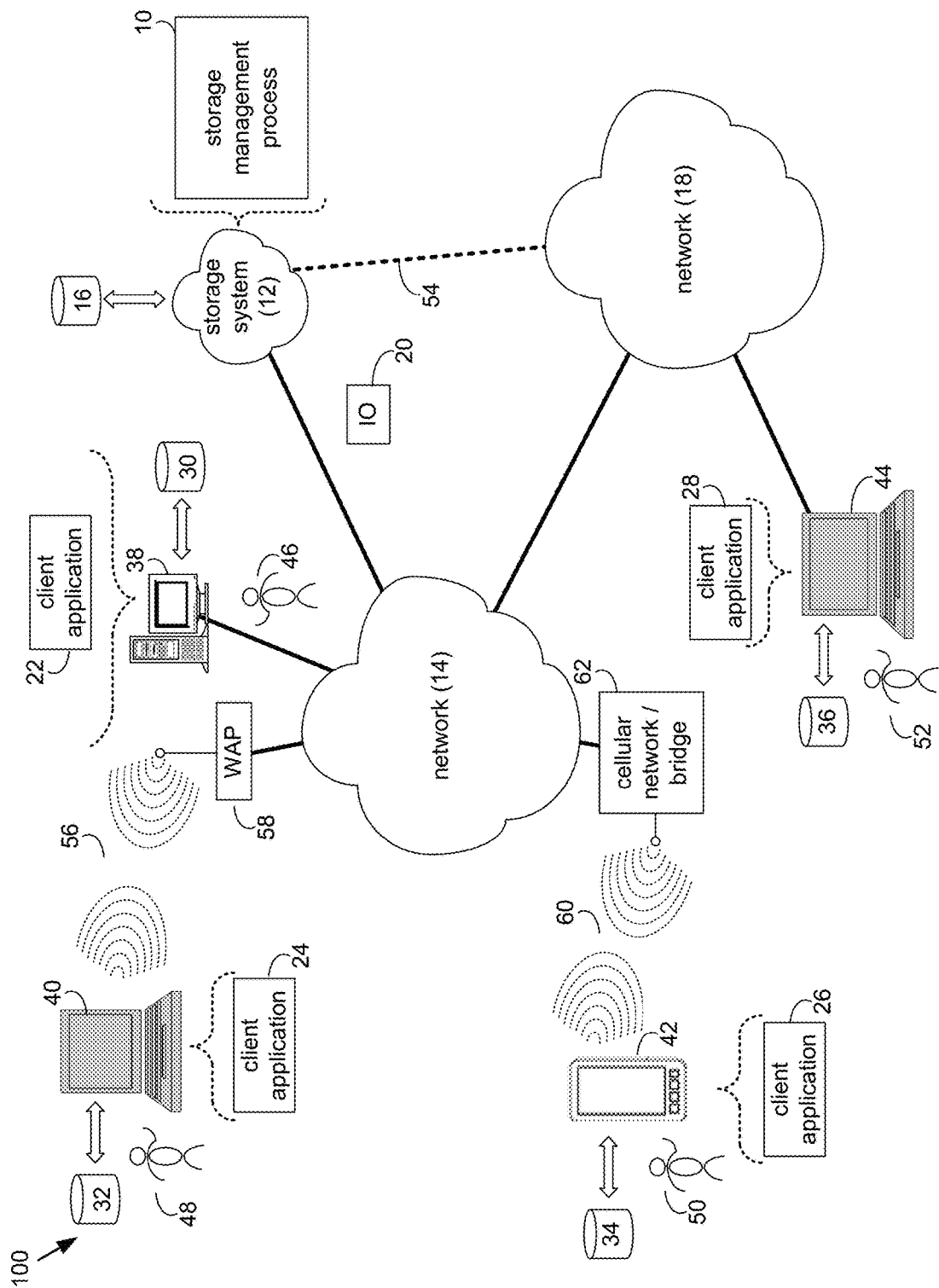
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process 10, such as storage management process 10 of FIG. 1, may include but is not limited to, partitioning an address space of a storage object of a log-structured file system into a plurality of slices, wherein the log-structured file system includes a plurality of storage objects in a plurality of storage tiers. One or more physical data blocks of the storage object may be allocated to each of the plurality of slices. A read temperature associated with at least one slice of the plurality of slices may be determined. A read temperature associated with each physical data block of the one or more physical data blocks allocated to the at least one slice may be determined. At least one physical data block of the one or more physical data blocks allocated to the at least one slice may be retiered between the plurality of storage tiers based upon, at least in part, the read temperature associated with each physical data block of the one or more physical data blocks allocated to the at least one slice.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
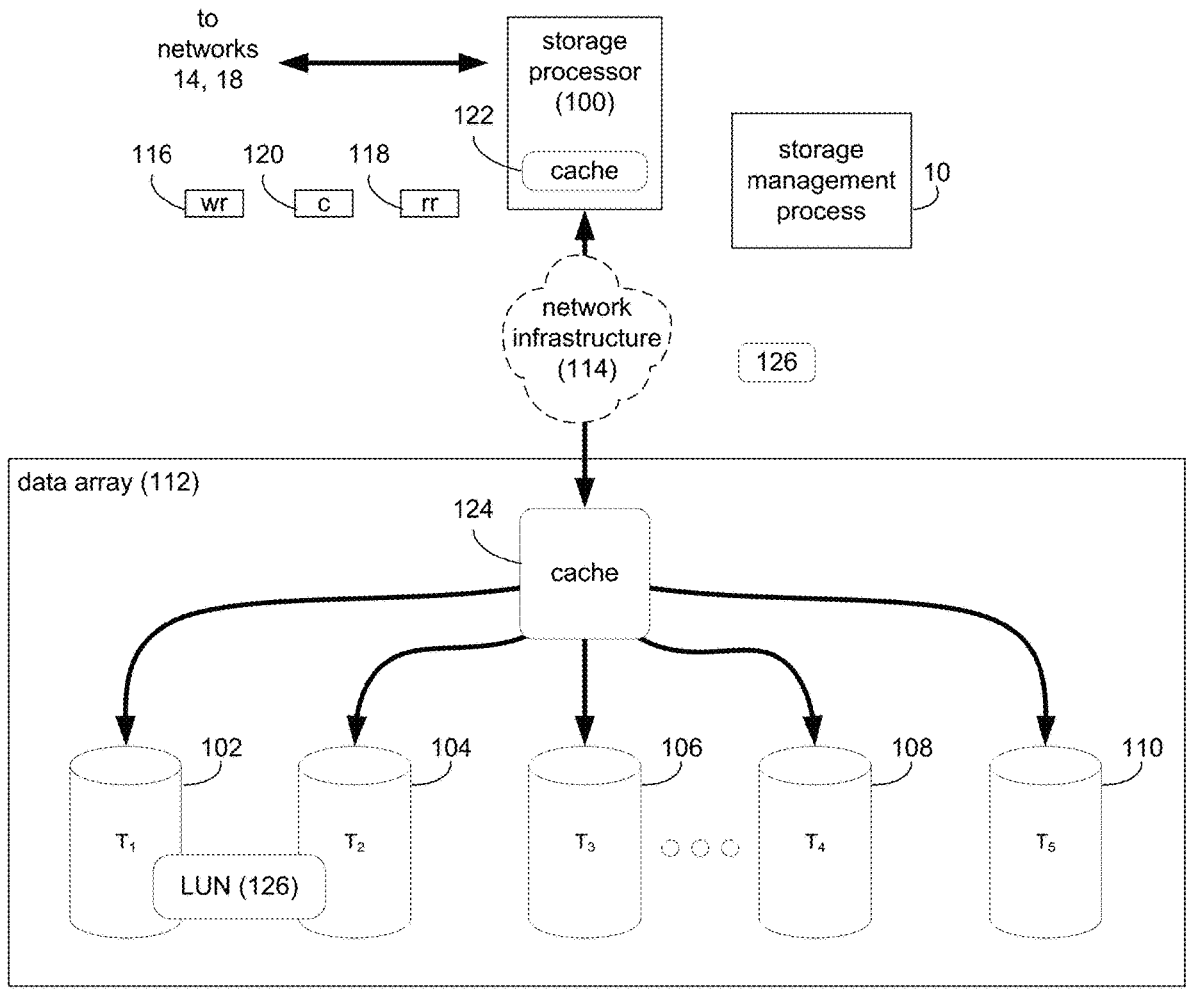
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable"

hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these 10 requests may be sent from client applications 22, 24, 26, 28 to storage system 12. Additionally/alternatively and when storage processor 100 is configured as an application server, these 10 requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As is known in the art, a logical unit number (LUN) is an identifier used for labeling and designating subsystems of physical or virtual storage. Depending on the environment, a LUN may refer to a subsection of a disk or a disk in its entirety. Different areas in physical drives may be assigned LUNs so data can be read, written or fetched correctly from servers on a storage area network (SAN). In both hard disk drives (HDDs) and solid state drives (SSDs), volumes of LUNs may make up the physical drive. In some implementations, LUNs (e.g., LUN 126) may be exported to a user by storage system 12 and mapped, where different regions of the logical address space are mapped to the different regions of the physical space on the different drives of data array 112.

Figure 3:
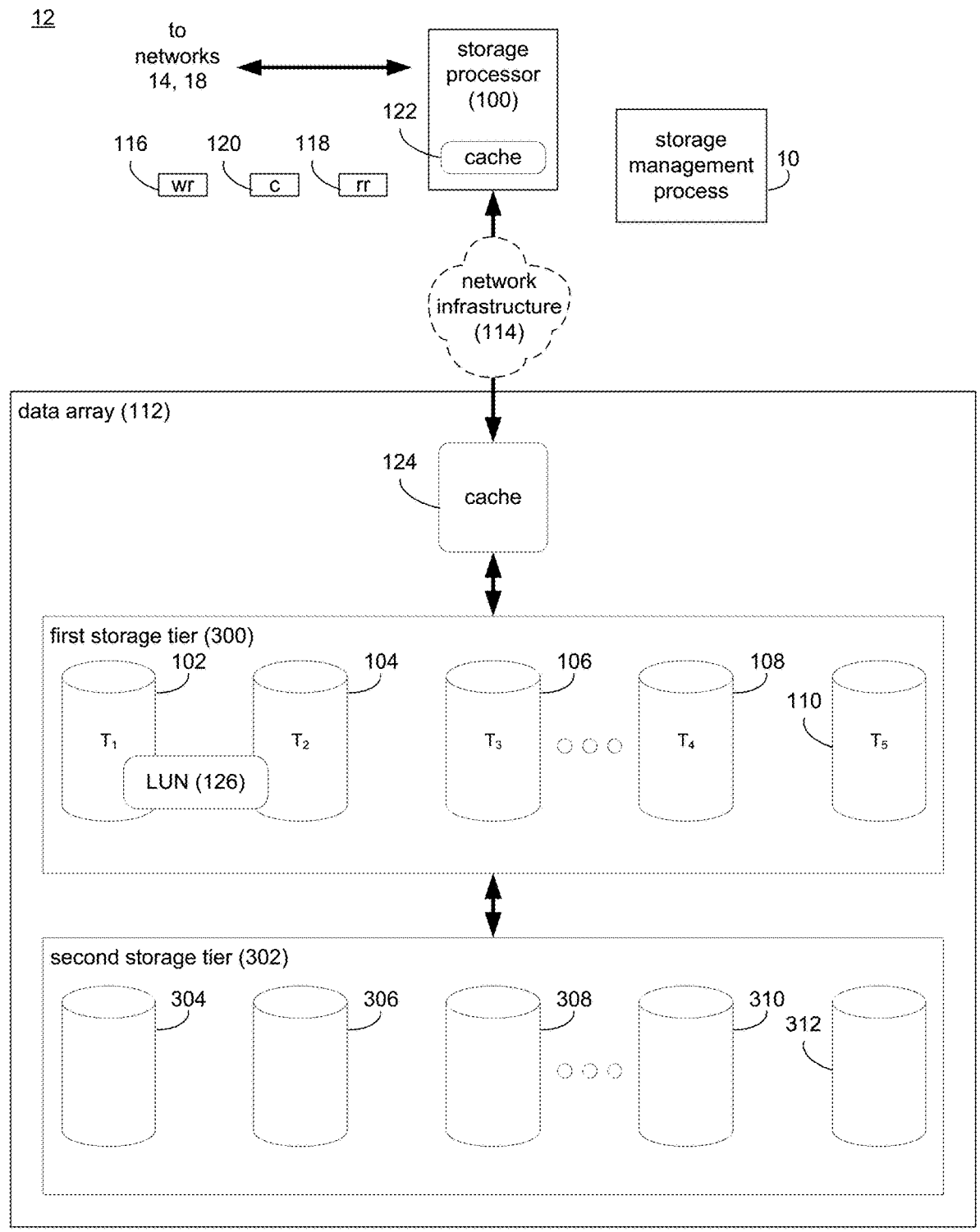

Referring also to the example of FIG. 3 and in some implementations, data array 112 is shown with a plurality of storage tiers (e.g., first storage tier 300 and second storage tier 302). While an example with two tiers has been described, it will be appreciated that any number of storage tiers may be used within the scope of the present disclosure. In some implementations, first storage tier 300 may include a plurality of storage devices (e.g., storage targets 102, 104, 106, 108, 110) and second storage tier 302 may include a plurality of storage targets (e.g., storage targets 304, 306, 308, 310, 312). While each storage tier has been described with five storage devices, it will be appreciated that any number of storage devices are possible within the scope of the present disclosure. In some implementations, each storage tier may provide different types of storage devices for different purposes. For example, one storage tier (e.g., first storage tier 300) may include storage devices dedicated for storing performance critical data while another storage tier (e.g., second storage tier 302) may include storage devices for providing general data storage. In some implementations, the storage devices of first storage tier 300 may be higher performance storage devices (e.g., solid-state disks) while the storage devices of second storage tier 302 may be lower performance storage devices relative to the higher performance storage devices of first storage tier 300 (e.g., hard-disk drives).

As will be discussed in greater detail below, moving data between storage tiers of data array 112 may generally be referred to as "auto-tiering" or "retiering". Accordingly, data may be stored in a higher performance storage tier when the data is in higher demand (e.g., relative to one or more pre-defined, user-defined, and/or automatically defined thresholds) and may be retired to a lower performance storage tier when the data is no longer in high demand. In some implementations, data may be retired from a lower performance storage tier to a higher performance storage tier when demand for the data increases.

Figure 4:
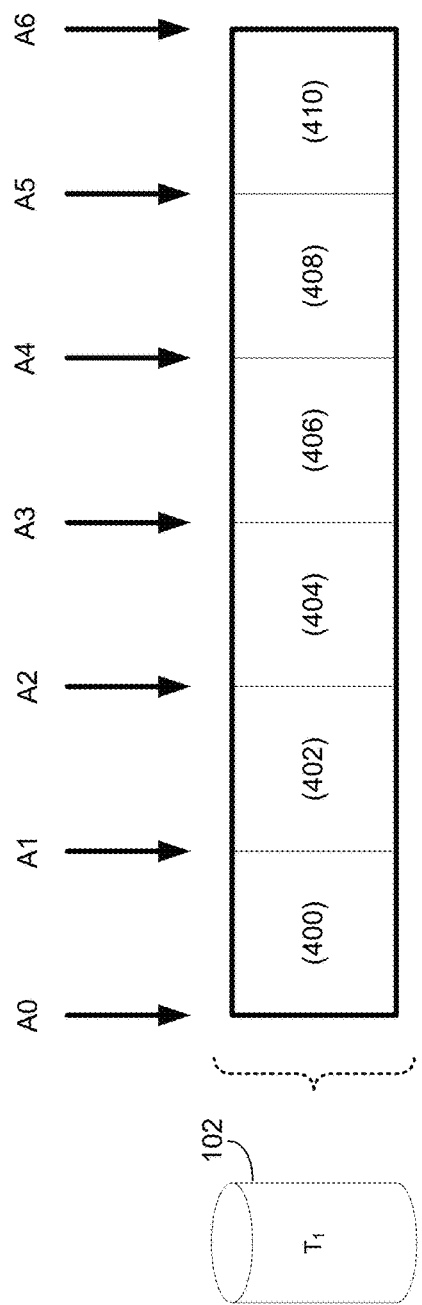
FIG. 4 is an example of diagrammatic view of a log-structured file system of the storage system according to one or more example implementations of the disclosure.
Figure 5:
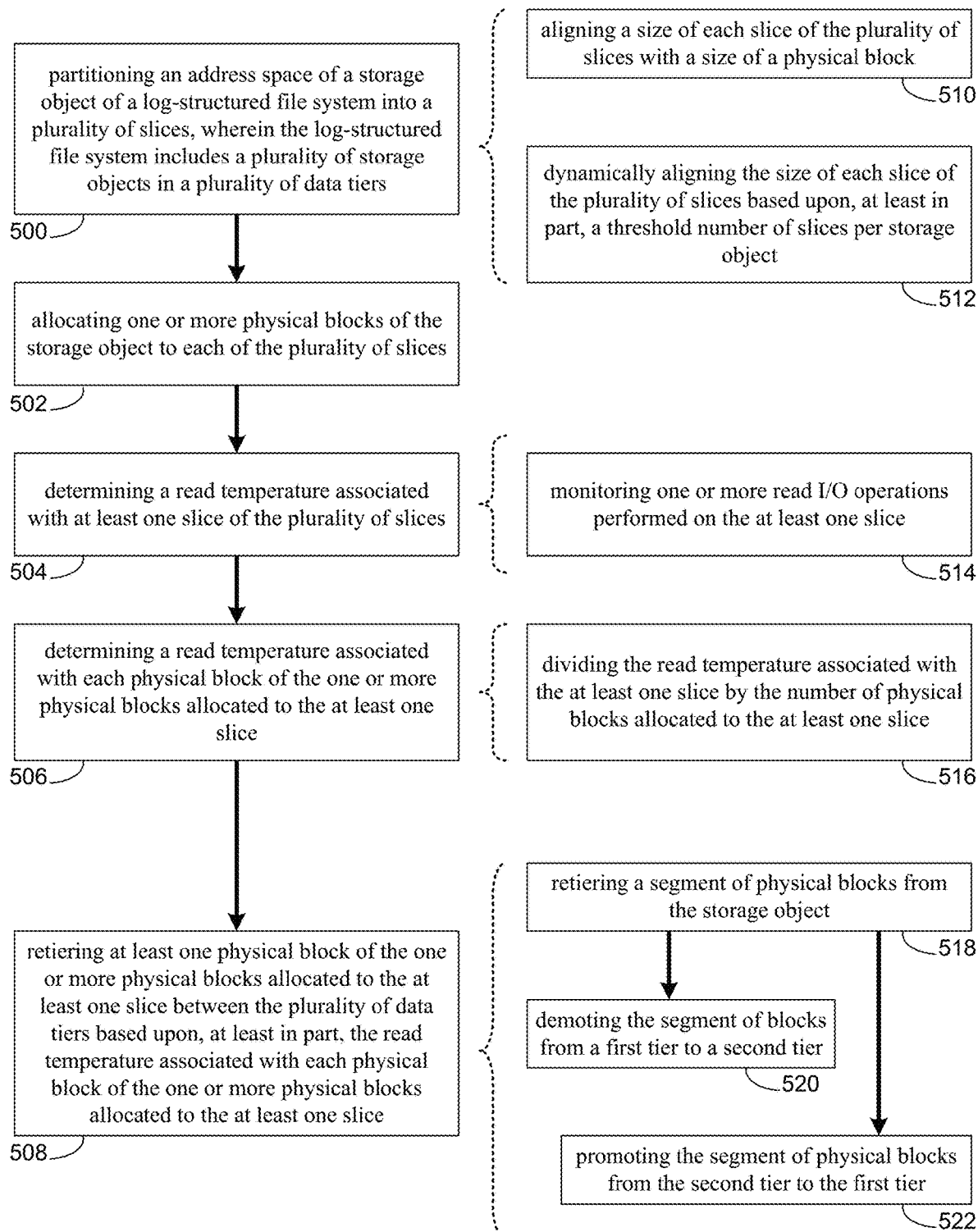
FIG. 5 is an example flowchart of the storage management process 10 of FIG. 1 according to one or more example implementations of the disclosure.
Figure 6:
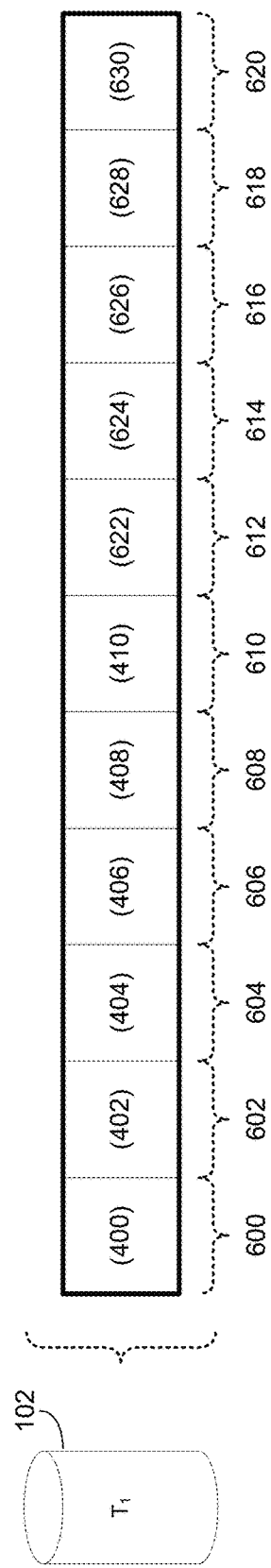
FIGS. 6-10 are example diagrammatic views of an address space of storage object of a log-structured file system partitioned into a plurality of slices according to one or more example implementations of the disclosure.

Referring also to the example of FIG. 4 and in some implementations, storage system 12 may be configured to store at least a portion of data in a log-structured file system. As is known in the art, a log-structured file system (LFS) may write data to a storage device by first buffering all updates (including metadata) in a memory portion or segment. When the segment is full, the segment may be written to the storage device in a long, sequential transfer to an unused portion of the storage device. For example, suppose data is configured to be written to storage device 102 in e.g., four physical data blocks (e.g., physical data blocks 400, 402, 404, 406). Following this buffering of data in memory, an inode block (e.g., block 408) may be written. As is known in the art, an inode block may be a pointer to previously written data to help locate the data when the data is written to the storage device. In this example, inode block 408 may include a pointer to each of physical data blocks 400, 402, 404, 406. In some implementations, an inode map block (e.g., block 410) may be written when new data is written to the storage device. An inode map block (e.g., block 410) may generally be a pointer to inode blocks stored in the log-structured file system. In some embodiments, each data block may be e.g., 4 kilobytes while an inode block and an inode map block may each be e.g., 128 bytes. Accordingly, the size of data blocks may be significantly larger than that of inode blocks and inode map blocks. In some embodiments, a plurality of physical data blocks (e.g., physical data blocks 400, 402, 404, 406, 408, 410) may be written to storage device 102 as a segment. In some implementations, each segment may be several megabytes. However, it will be appreciated that any physical data block size, inode block size, inode map block size, and/or segment size may be used within the scope of the present disclosure.

The Storage Management Process:

Referring also to FIGS. 5-10 and in some implementations, storage management process 10 may partition 500 an address space of a storage object of a log-structured file system into a plurality of slices, wherein the log-structured file system includes a plurality of storage objects in a plurality of storage tiers. One or more physical data blocks of the storage object may be allocated 502 to each of the plurality of slices. A read temperature associated with at least one slice of the plurality of slices may be determined 504. A read temperature associated with each physical data block of the one or more physical data blocks allocated to the at least one slice may be determined 506. At least one physical data block of the one or more physical data blocks allocated to the at least one slice may be retiered 508 between the plurality of storage tiers based upon, at least in part, the read temperature associated with each physical data block of the one or more physical data blocks allocated to the at least one slice.

As will be discussed in greater detail below, implementations of the present disclosure may utilize read temperature of logical slices of a storage device within a log-structured file system to auto-tier data. As discussed above, various conventional auto-tiering processes may periodically remap LUNs to keep the most actively used LUNS on the fastest drives to maximize the array performance. An example of such an auto-tiering process is Fully Automated Storage Tiering for Virtual Pools (FAST VP) developed by Dell-EMC of Hopkinton, Mass. These auto-tiering processes generally monitor IO related statistics and aggregate them to filter out IO spikes and IO fluctuations. The aggregated statistics are usually called "temperature". The higher the temperature of a space or region, the more actively that space or portion is accessed. Accordingly, conventional auto-tiering processes may put the regions with the highest temperature on the drives with the best performance characteristics, for example, solid-state drives (SSD). The coldest regions may be moved to the storage with the cheapest capacity, for example, NL-SAS or hard-disk drives.

Conventional auto-tiering processes request statistics and update the temperatures at a periodic basis to have a consistent picture of the I/O distribution and relocates regions at a dedicated maintenance window or by the request from a user. This approach generally works well for normal file systems where regions of logical space are mapped "firmly" to some physical regions. However, log-structured file systems do not update data in the place were data is previously written, as data is buffered to blocks, packed in a segment, and then written to an empty physical space within a storage device. Accordingly, the following challenges may be observed when auto-tiering with storage devices in a log-structured file system: the logical data, which are updated constantly, are written to the new place at every update, so the "write temperature" of a physical region does not make sense as a metric to indicate frequently used storage device regions; logically adjacent data are often distributed over multiple segments that can be physically far from each other; and the segments are relatively small in size resulting in a larger number of segments, which means that tracking temperature for every segment may be not feasible. As will be discussed in greater detail below, implementations of the present disclosure may utilize read temperature of logical slices of a storage object within a log-structured file system to auto-tier data.

In some implementations, storage management process 10 may partition 500 an address space of a storage object of a log-structured file system into a plurality of slices, wherein the log-structured file system includes a plurality of storage objects in a plurality of storage tiers. Referring again to the example of FIG. 4 and in some implementations, a log-structured file system may include several storage objects (e.g., storage target 102) that may include an address space (e.g., represented as address space between "A0" and "A6"). While FIG. 4 shows an address space between "A0" and "A6", it will be appreciated that any sized address space may be used within the scope of the present disclosure. As will be discussed in greater detail below, a slice may generally refer to a logical group or portion of physical storage space within a log-structured file system. Accordingly, an address space of a storage object of a log-structured file system may be partitioned 500 into a plurality of slices without physically altering or moving the data within the address space.

In this manner, each slice may be a grouping of portions of the address space of the storage object.

In some implementations, partitioning 500 the address space of the storage object into a plurality of slices may include one or more of: aligning 510 a size of each slice of the plurality of slices with a size of a physical data block, and dynamically aligning 512 the size of each slice of the plurality of slices based upon, at least in part, a threshold number of slices per storage object. Referring also to the example of FIG. 6 and in some implementations, partitioning 500 the address space of storage target 102 into a plurality of slices may include aligning 510 a size of each slice (e.g., slices 600, 602, 604, 606, 608, 610, 612, 614, 626, 618, 620) with a size of a physical data block (e.g., physical data blocks 400, 402, 404, 406, 408, 410, 622, 624, 626, 628, 630). In this example, a slice (e.g., slices 600, 602, 604, 606, 608, 610, 612, 614, 626, 618, 620) can start from logical address aligning to an individual physical data block (e.g., physical data blocks 400, 402, 404, 406, 408, 410, 622, 624, 626, 628, 630). Accordingly and in some implementations, block size may be the lowest possible granularity for partitioning 500 the address space of storage object 102. However, the lower the partitioning granularity, the greater the number of slices per storage object. This large number of slices per storage object may result in challenges when searching and storing the corresponding information. While an example partitioning granularity of a physical data block has been provided, it will be appreciated that any granularity (e.g., more granular or less granular) may be used when partitioning 500 with address space of the storage object within the scope of the present disclosure.

In some implementations, storage management process 10 may partition 500 the address space into slices by aligning the slice size with a predefined physical size. For example and in some implementations, storage management process 10 may align a slice to a predefined size (e.g., 256 megabytes). In this example, the number of physical slices may be small, but the preciseness of the logical temperature calculation may be low. While an example of a predefined size of 256 megabytes has been provided, it will be appreciated that a slice may be aligned to any predefined physical size of address space within the scope of the present disclosure.

Figure 7:
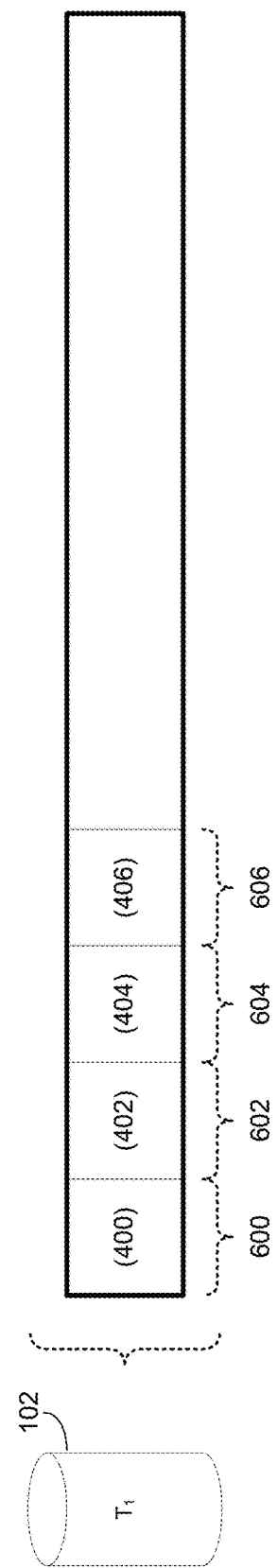

In some implementations, partitioning 500 the address space of the storage object into a plurality of slices may include dynamically aligning 512 the size of each slice of the plurality of slices based upon, at least in part, a threshold number of slices per storage object. Referring also to the examples of FIGS. 7-9 and in some implementations, storage management process 10 may dynamically align 512 the size of each slice of the plurality of slices by limiting the total number of slices per storage object. For example and referring also to FIG. 7, suppose storage target 102 includes e.g., four blocks (e.g., four blocks 400, 402, 404, 406). In this example, storage management process 10 may include a threshold number of slices per storage object (e.g., four slices per storage object). In some implementations, storage management process 10 may automatically define a threshold number of slices and/or may receive a threshold number of slices from a user and/or other sources. In the example of FIG. 7, storage management process 10 may start with a fine granularity (e.g., 128 kilobytes, shown as one slice per block for ease of explanation). As the amount of data grows (e.g., more blocks are added), storage management process 10 may increase the size of slices and combine adjacent slices to keep the number of slices at or below the threshold number of slices per storage object. While an example initial granularity has been described above as 128 kilobytes, it will be appreciated that storage management process 10 may dynamically align 512 the size of each slice of the plurality of slices starting with any granularity within the scope of the present disclosure.

Figure 8:
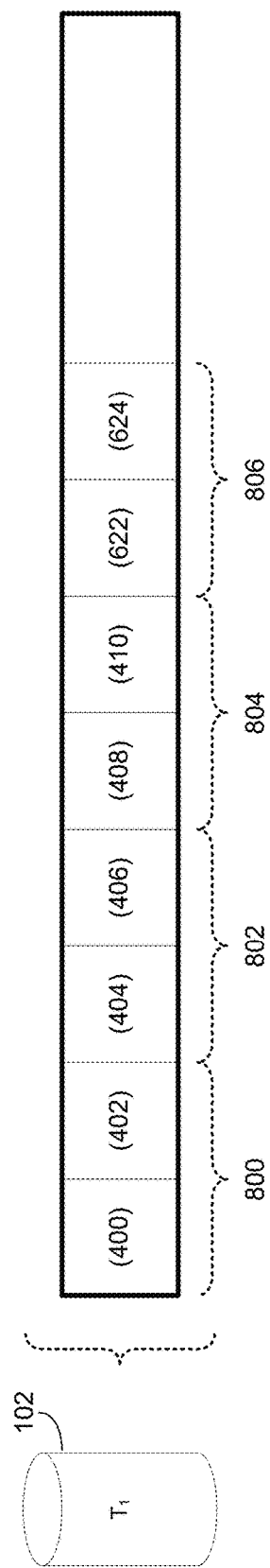

For example and referring also to the example of FIG. 8, storage target 102 may add e.g., four more blocks (e.g., blocks 408, 410, 622, 624). Accordingly, storage management process 10 may dynamically align 512 (or realign) each slice of the plurality of slices based upon, at least in part, the threshold number of slices per storage object. In this example, storage management process 10 may dynamically align 512 each slice from e.g., one block to one slice to e.g., two blocks to one slice. Accordingly, storage management process 10 may dynamically align 512 blocks 400 and 402 into slice 800; blocks 404 and 406 into slice 802; blocks 408 and 410 into slice 804; blocks 622 and 624 into slice 806. In this example and following the dynamic alignment of e.g., two blocks into one slice, storage management process 10 may maintain the threshold number of slices per storage object (e.g., four slices per storage object).

Figure 9:
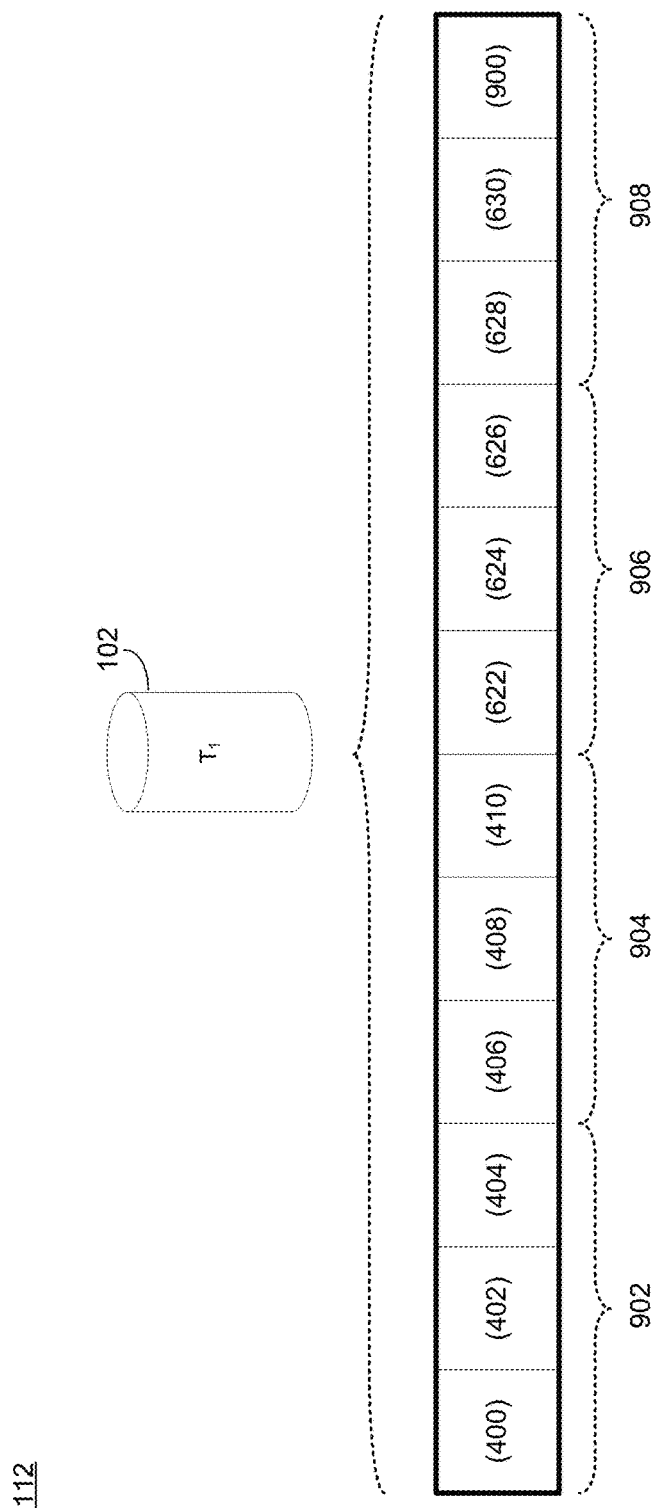
Figure 10:
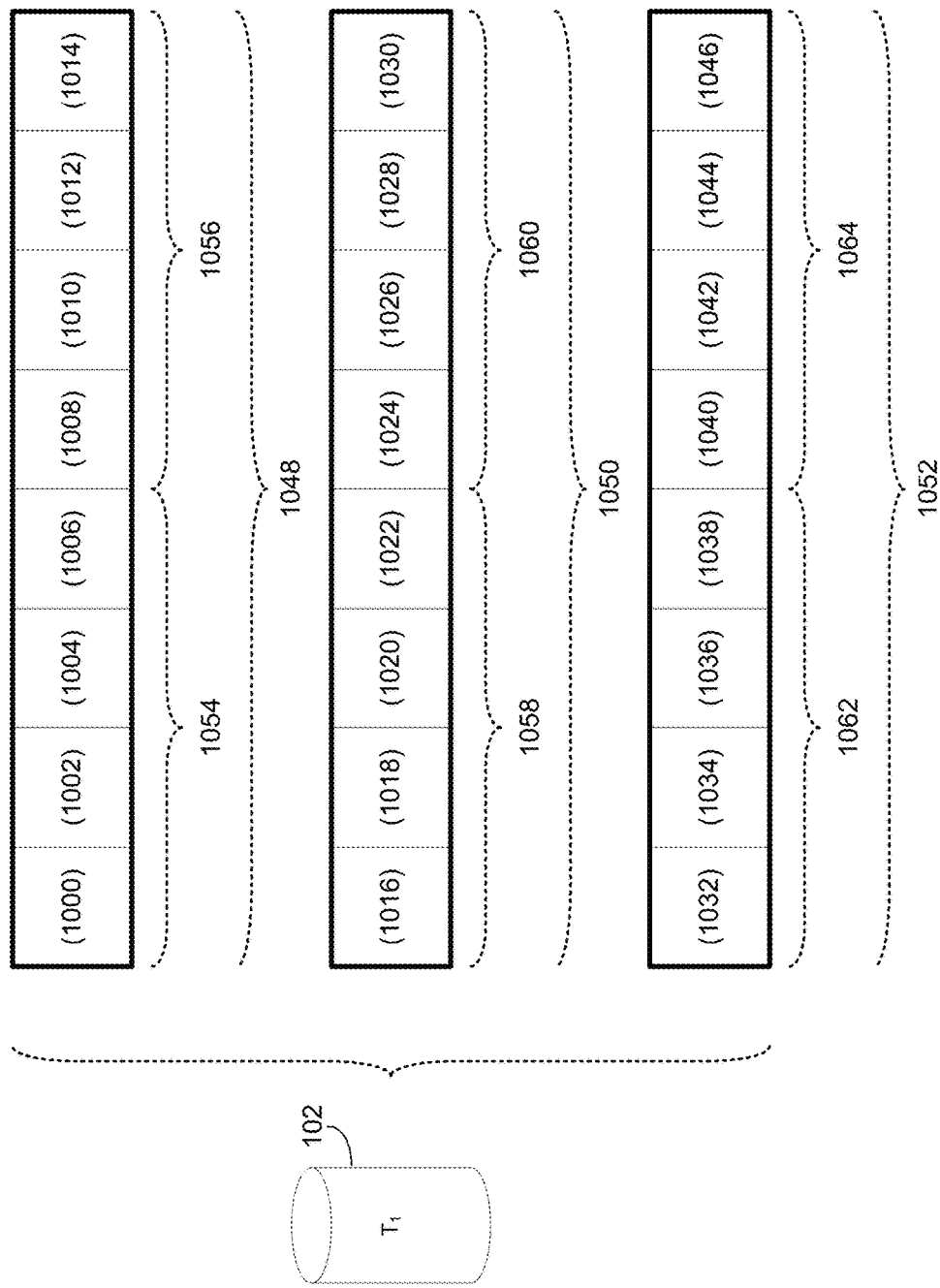

Referring also to the example of FIG. 9 and in some implementations, storage object 102 may add e.g., four additional blocks (e.g., 626, 628, 630, 900). Accordingly, storage management process 10 may dynamically align 512 (or realign) each slice of the plurality of slices based upon, at least in part, the threshold number of slices per storage object. In this example, storage management process 10 may dynamically align 512 each slice from e.g., two blocks to one slice to e.g., three blocks to one slice. Accordingly, storage management process 10 may dynamically align 512 blocks 400, 402, 404 into slice 902; blocks 406, 408, 410 into slice 904; blocks 622, 624, 626 into slice 906; blocks 628, 630, 900 into slice 908. In this example and following the dynamic alignment of e.g., three blocks into one slice, storage management process 10 may maintain the threshold number of slices per storage object (e.g., four slices per storage object). While the examples of FIGS. 7-9 include a threshold number of slices (e.g., four slices), it will be appreciated that any number of slices per storage object may be used within the scope of the present disclosure. Additionally, any size or number of blocks per slice may be used within the scope of the present disclosure.

In some implementations, storage management process 10 may allocate 502 one or more physical data blocks of the storage object to each of the plurality of slices. As discussed above, partitioning 500 the address space of a storage object may include aligning 510 each slice based upon, a threshold number of slices per storage object. As shown in the examples of FIGS. 6-9, storage management process 10 may allocate 502 one or more physical data blocks of the storage object to each slice. In some implementations, storage management process 10 may generate a mapping between the plurality of slices and the one or more physical data blocks allocated to each slice. In some implementations, each storage object may include a map of allocated physical data blocks to slices. As discussed above, storage management process 10 may define an alignment factor for the slices and address space of the storage object. Once a new address is mapped, storage management process 10 may calculate the address of the corresponding slice (e.g., by dividing the address to an alignment factor (i.e., how address space is partitioned 500 into slices) and add an entry to the map (if it does not exist). If the corresponding entry exists in the map, storage management process 10 may increment the number of allocated blocks. In some implementations, once an address is unmapped, storage management process 10 may decrease the number of allocated blocks and/or delete the entry if the number of allocated blocks is zero. In some implementations, once the number of entries becomes larger than a specified threshold, the alignment factor may be increased and the entries may be mapped to a larger slice and the IO statistics of each entry may be combined. In some implementations, the mapping of slices to allocated physical data blocks may be stored as a data block (similar to the inode map block of a log-structured file system as discussed above and shown in the example of FIG. 4).

In some implementations, storage management process 10 may determine 504 a read temperature associated with at least one slice of the plurality of slices. A read temperature may generally include aggregated I/O statistics associated with a plurality of IO operations (e.g., read operations) performed on a storage object. As discussed above, with a log-structured file system, logical space (e.g., LUNs) may not be firmly mapped to physical regions of a storage object as any updates to existing data does not overwrite existing data. Rather, new data is generally written to a different portion of a log-structured file system. Accordingly, using write I/O data or a combination of read and write temperature may be less accurate in a log-structured file system for determining which portions of data to retier among a plurality of storage tiers.

In some implementations, determining 504 the read temperature associated with the at least one slice of the plurality of slices may include monitoring 514 one or more read I/O operations performed on the at least one slice. In some implementations, storage management process 10 may update I/O counters as an I/O goes to a particular slice. Periodically, storage management process 10 may update slice read temperatures. For example, storage management process 10 may recalculate e.g., once an hour, the exponential moving average on an average number of input/output operations per second (IOPS) during the interval with a history size of e.g., 24 hours. While an example of an exponential moving average on an average number of IOPS during a 24 hour interval has been described for determining a read temperature of a particular slice, it will be appreciated that various statistics associated with monitoring 514 the one or more read I/O operations performed on the at least one slice may be used within the scope of the present disclosure.

Referring again to the example of FIG. 9 and in some implementations, suppose storage management process 10 receives a plurality of read I/O operations for different slices of storage target 102. Suppose for example purposes that storage management process 10 determines that slice 902 has a slice temperature of e.g., 105 IOPS over a 24-hour period; slice 904 has a slice temperature of e.g., 81 IOPS over a 24-hour period; slice 906 has a slice temperature of e.g., 60 IOPS over a 24-hour period; and slice 908 has a slice temperature of e.g., 30 IOPS over a 24-hour period. While example read temperatures have been described in terms of an average IOPS over a 24-hour period, it will be appreciated that other statistics may be used to generate a read temperature for each slice. For example and in some implementations, other statistics may be weighted (e.g., per-defined and/or user-defined weights for each statistic) to determine a read temperature for the slice.

In some implementations, storage management process 10 may determine 506 a read temperature associated with each physical data block of the one or more physical data blocks allocated to the at least one slice. For example and in some implementations, storage management process 10 may determine 506 a read temperature associated with each physical data block allocated to a slice based upon, at least in part, the number of physical data blocks allocated to the slice and the read temperature of the slice.

For example and in some implementations, determining 506 the read temperature associated with each physical data block of the one or more physical data blocks allocated to the at least one slice may include dividing 516 the read temperature associated with the at least one slice by the number of physical data blocks allocated to the at least one slice. Continuing with the above example and in some implementations, storage management process 10 may determine 506 the read temperature for a single block by dividing 516 the slice temperature by the number of blocks allocated to the slice. For example, storage management process 10 may determine the read temperature of each physical data block (e.g., physical data blocks 400, 402, 404, 406, 408, 410 622, 624, 626, 628, 630, 900) by dividing 516 the read temperature of each slice by the number of physical data blocks allocated to each slice. In this example, storage management process 10 may determine 506 a read temperature of e.g., 35 IOPS over a 24-hour period for physical data blocks 400, 402, 404 allocated to slice 902; a read temperature of e.g., 27 IOPS over a 24-hour period for physical data blocks 406, 408, 410 allocated to slice 904; a read temperature of e.g., 20 IOPS over a 24-hour period for physical data blocks 622, 624, 626 allocated to slice 906; and a read temperature of e.g., 10 IOPS over a 24-hour period for physical data blocks 628, 630, 900 allocated to slice 908.

In some implementations, storage management process 10 may store the read temperature associated with each physical data block by generating (and/or updating) a table with an address for each block and its associated read temperature. In some implementations, this table may be used to retrieve the corresponding temperatures for particular physical data blocks. In some implementations, the retrieval of read temperatures may be optimized. For example, storage management process 10 may provide a single request to the generated table for all physical data blocks belonging to the same slice instead of multiple requests for the read temperature of each physical data blocks. In some implementations, the above-described table may be stored in log-structured file system similarly to the inode map block of the log-structured file system as discussed above and shown in the example of FIG. 4).

In some implementations, storage management process 10 may retier 508 at least one physical data block of the one or more physical data blocks allocated to the at least one slice between the plurality of storage tiers based upon, at least in part, the read temperature associated with each physical data block of the one or more physical data blocks allocated to the at least one slice. As discussed above, retiering 508 at least one physical data block of the one or more physical data blocks allocated to the at least one slice between the plurality of storage tiers may generally include moving data between storage tiers of data array. Accordingly, one or more physical data blocks may be stored in a higher performance storage tier when the data is in higher demand (e.g., relative to one or more pre-defined, user-defined, and/or automatically defined thresholds) and may be retiered 508 to a lower performance storage tier when the one or more physical data blocks are no longer in high demand. In some implementations, one or more physical data blocks may be retiered 508 from a lower performance storage tier to a higher performance storage tier when demand for the one or more physical data blocks increases. It will be appreciated that storage management process 10 may retier 508 the one or more physical data blocks between the plurality of storage tiers for various reasons and/or based upon, at least in part, various algorithms within the scope of the present disclosure.

In some implementations and as discussed above, a first storage tier may include a plurality of solid state drives and a second storage tier may include a plurality of hard disk drives. Referring again to the example of FIGS. 3 and 9 and in some implementations, storage management process 10 may retier 508 one or more physical data blocks (e.g., physical data blocks 400, 402, 404, 406, 408, 410, 622, 624, 626, 628, 630, 900) between the first storage tier of solid state drives (e.g., first storage tier 300) and the second storage tier of hard disk drives (e.g., second storage tier 302). For example and returning to the above example, suppose storage management process 10 is configured (e.g., by a user, algorithm, and/or other process) to retier 508 physical data blocks from the first storage tier (e.g., first storage tier 300) with e.g., a read temperature less than a predefined threshold. In this example, suppose the predefined read temperature threshold is e.g., 15 IOPS per 24 hour period. Accordingly, storage management process 10 may retier 508 physical storage blocks 628, 630, 900 allocated to slice 908 because each of physical storage blocks 628, 630, 900 have a read temperature (e.g., 10 IOPS per 24-hour period) which is less than the predefined read temperature threshold (e.g., 15 IOPS per 24-hour period). While an example predefined read temperature threshold has been discussed above, it will be appreciated that any predefined read temperature threshold is within the scope of the present disclosure.

In some implementations, retiering 508 the at least one physical data block of the one or more physical data blocks allocated to the at least one slice may include retiering 518 a segment of physical data blocks from the storage object. As discussed above, a segment may generally include a pre-defined number of blocks buffered in memory used within a log-structured file system to reduce the number of writes to a storage object. In some implementations, a slice may be greater in size than a segment. For example and returning again to the example of FIG. 4, suppose each physical data block is 4 kilobytes. A segment may include a plurality of physical data blocks (e.g., several hundred kilobytes to a few megabytes) while a slice may be allocated with physical data blocks totaling several megabytes. Referring also to the example of FIG. 10 and in some implementations, suppose storage management process 10 partitions 500 address space (e.g., physical data blocks 1000, 1002, 1004, 1006, 1008, 1010, 1012, 1014, 1016, 1018, 1020, 1022, 1024, 1026, 1028, 1030, 1032, 1034, 1036, 1038, 1040, 1042, 1044, 1046) of storage target 102 into a plurality of slices (e.g., slices 1048, 1050, 1052). Further, suppose physical data blocks are grouped into a plurality of segments (e.g., segments 1054, 1056, 1058, 1060, 1062, 1064) with physical data blocks 1000, 1002, 1004, 1006 in segment 1054; physical data blocks 1008, 1010, 1012, 1014 in segment 1056; physical data blocks 1016, 1018, 1020, 1022 in segment 1058; physical data blocks 1024, 1026, 1028, 1030 in segment 1060; physical data blocks 1032, 1034, 1036, 1038 in segment 1062; and physical data blocks 1040, 1042, 1044, 1046 in segment 1064. In some implementations, process may allocate 502 physical data blocks 1000, 1002, 1004, 1006, 1008, 1010, 1012, 1014 into slice 1048; physical data blocks 1016, 1018, 1020, 1022, 1024, 1026, 1028, 1030 into slice 1050; and physical data blocks 1032, 1034, 1036, 1038, 1040, 1042, 1044, 1046 into slice 1052. While the above example includes e.g., 24 physical data blocks, six segments, and three slices, it will be appreciated that any number of physical data blocks may define any number of segments and that any number of physical data blocks may be allocated to each slice.

Continuing with the above example, suppose that storage management process 10 determines 504 that slice 1048 has a read temperature of e.g., 40 IOPS per 24-hour period; slice 1050 has a read temperature of e.g., 80 IOPS per 24-hour period; and slice 1052 has a read temperature of e.g., 120 IOPS per 24-hour period. In some implementations, storage management process 10 may determine 506 that physical data blocks 1000, 1002, 1004, 1006, 1008, 1010, 1012, 1014 each have a read temperature of e.g., 5 IOPS per 24-hour period; physical data blocks 1016, 1018, 1020, 1022, 1024, 1026, 1028, 1030 each have a read temperature of e.g., 10 IOPS per 24-hour period; and physical data blocks 1032, 1034, 1036, 1038, 1040, 1042, 1044, 1046 each have a read temperature of e.g., 15 IOPS per 24-hour period.

In some implementations, retiering 518 the segment of physical data blocks may include one or more of: demoting 520 the segment of blocks from a first tier to a second tier, and promoting 522 the segment of physical data blocks from the second tier to the first tier. In some implementations and continuing with the above example, suppose storage management process 10 is configured to (e.g., by a user, algorithm, and/or other process) retier 518 segment(s) of physical data block based upon, at least in part, a predefined threshold read temperature. For example, suppose the predefined threshold read temperature is e.g., 8 IOPS per 24-hour period (e.g., segments with a read temperature stored in a second storage tier greater than the predefined threshold read temperature are to be promoted 522 from the second storage tier to the first storage tier and segments with a read temperature stored in a first storage tier less than the predefined threshold read temperature to be demoted 520 from the first storage tier to the second storage tier). In this example, because physical data blocks 1000, 1002, 1004, 1006, 1008, 1010, 1012, 1014 each have a read temperature of e.g., 5 IOPS per 24-hour period, storage management process 10 may demote 520 the segment of blocks (e.g., segments 1054, 1056) from storage tier 102 of first storage tier 300 to another storage tier (e.g., storage target 304) of second storage tier 302.

In another example, suppose storage management process 10 is configured to (e.g., by a user, algorithm, and/or other process) retier 518 segment(s) of physical data block based upon, at least in part, a predefined threshold read temperature. For example, suppose the predefined threshold read temperature is e.g., 8 IOPS per 24-hour period (e.g., segments with a read temperature stored in a second storage tier greater than the predefined threshold read temperature are to be promoted 522 from the second storage tier to the first storage tier and segments with a read temperature stored in a first storage tier less than the predefined threshold read temperature to be demoted 520 from the first storage tier to the second storage tier). Further suppose, storage management process 10 determines that the read temperature of slice 1048 increases from e.g., 40 IOPS per 24-hour period to e.g., 45 IOPS per 24-hour period and that physical data blocks 1000, 1002, 1004, 1006, 1008, 1010, 1012, 1014 each have a read temperature of e.g., 9 IOPS per 24-hour period. In this example, because physical data blocks 1000, 1002, 1004, 1006, 1008, 1010, 1012, 1014 each have a read temperature of e.g., 9 IOPS per 24-hour period, storage management process 10 may promote 522 the segment of blocks (e.g., segments 1054, 1056) from storage tier 304 of second storage tier 302 to another storage tier (e.g., storage target 102) of first storage tier 300.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   partitioning an address space of a storage object of a log-structured file system into a plurality of slices, wherein the log-structured file system includes a plurality of storage objects in a plurality of storage tiers, wherein the plurality of storage objects are configured to receive read IO operations and write IO operations;
   allocating one or more physical data blocks of the storage object to each of the plurality of slices;
   determining a read temperature associated with at least one slice of the plurality of slices;
   determining a read temperature associated with each physical data block of the one or more physical data blocks allocated to the at least one slice; and
   retiering at least one physical data block of the one or more physical data blocks allocated to the at least one slice between the plurality of storage tiers based upon, at least in part, the read temperature associated with each physical data block of the one or more physical data blocks allocated to the at least one slice, wherein the retiering is not based on any write temperature associated with the log-structured file system.

2. The computer-implemented method of claim 1, wherein partitioning the address space of the storage object into a plurality of slices includes one or more of:
   aligning a size of each slice of the plurality of slices with a size of a physical data block, and
   dynamically aligning the size of each slice of the plurality of slices based upon, at least in part, a threshold number of slices per storage object.

3. The computer-implemented method of claim 1, wherein determining the read temperature associated with the at least one slice of the plurality of slices includes monitoring one or more read IO operations performed on the at least one slice.

4. The computer-implemented method of claim 1, wherein determining the read temperature associated with each physical data block of the one or more physical data blocks allocated to the at least one slice includes dividing the read temperature associated with the at least one slice by the number of physical data blocks allocated to the at least one slice.

5. The computer-implemented method of claim 1, wherein retiering the at least one physical data block of the one or more physical data blocks allocated to the at least one slice includes retiering a segment of physical data blocks from the storage object.

6. The computer-implemented method of claim 5, wherein retiering the segment of physical data blocks includes one or more of:
   demoting the segment of physical data blocks from a first tier to a second tier, and
   promoting the segment of physical data blocks from the second tier to the first tier.

7. The computer-implemented method of claim 6, wherein the first tier includes a plurality of solid state drives and the second tier includes a plurality of hard disk drives.

8. A computer program product residing on a non-transitory computer readable medium having a plurality of instructions stored thereon which, when executed by a processor, cause the processor to perform operations comprising:
   partitioning an address space of a storage object of a log-structured file system into a plurality of slices, wherein the log-structured file system includes a plurality of storage objects in a plurality of storage tiers, wherein the plurality of storage objects are configured to receive read IO operations and write IO operations;
   allocating one or more physical data blocks of the storage object to each of the plurality of slices;
   determining a read temperature associated with at least one slice of the plurality of slices;
   determining a read temperature associated with each physical data block of the one or more physical data blocks allocated to the at least one slice; and
   retiering at least one physical data block of the one or more physical data blocks allocated to the at least one slice between the plurality of storage tiers based upon, at least in part, the read temperature associated with each physical data block of the one or more physical data blocks allocated to the at least one slice, wherein the retiering is not based on any write temperature associated with the log-structured file system.

9. The computer program product of claim 8, wherein partitioning the address space of the storage object into a plurality of slices includes one or more of:
   aligning a size of each slice of the plurality of slices with a size of a physical data block, and
   dynamically aligning the size of each slice of the plurality of slices based upon, at least in part, a threshold number of slices per storage object.

10. The computer program product of claim 8, wherein determining the read temperature associated with the at least one slice of the plurality of slices includes monitoring one or more read IO operations performed on the at least one slice.

11. The computer program product of claim 8, wherein determining the read temperature associated with each physical data block of the one or more physical data blocks allocated to the at least one slice includes dividing the read temperature associated with the at least one slice by the number of physical data blocks allocated to the at least one slice.

12. The computer program product of claim 8, wherein retiering the at least one physical data block of the one or more physical data blocks allocated to the at least one slice includes retiering a segment of physical data blocks from the storage object.

13. The computer program product of claim 12, wherein retiering the segment of physical data blocks includes one or more of:
   demoting the segment of physical data blocks from a first tier to a second tier, and
   promoting the segment of physical data blocks from the second tier to the first tier.

14. The computer program product of claim 13, wherein the first tier includes a plurality of solid state drives and the second tier includes a plurality of hard disk drives.

15. A computing system comprising:
   a memory architecture; and a processor configured to partition an address space of a storage object of
a log-structured file system into a plurality of slices, wherein the log-structured file system includes a plurality of storage objects in a plurality of storage tiers, wherein the plurality of storage objects are configured to receive read IO operations and write IO operations, the processor further configured to allocate one or more physical data blocks of the storage object to each of the plurality of slices, the processor further configured to determine a read temperature associated with at least one slice of the plurality of slices, the processor further configured to determine a read temperature associated with each physical data block of the one or more physical data blocks allocated to the at least one slice, and the processor further configured to retier at least one physical data block of the one or more physical data blocks allocated to the at least one slice between the plurality of storage tiers based upon, at least in part, the read temperature associated with each physical data block of the one or more physical data blocks allocated to the at least one slice, wherein the retiering is not based on any write temperature associated with the log-structured file system.

16. The computing system of claim 15, wherein partitioning the address space of the storage object into a plurality of slices includes one or more of:

aligning a size of each slice of the plurality of slices with a size of a physical data block, and dynamically aligning the size of each slice of the plurality of slices based upon, at least in part, a threshold number of slices per storage object.

17. The computing system of claim 15, wherein determining the read temperature associated with the at least one slice of the plurality of slices includes monitoring one or more read TO operations performed on the at least one slice.

18. The computing system of claim 15, wherein determining the read temperature associated with each physical data block of the one or more physical data blocks allocated to the at least one slice includes dividing the read temperature associated with the at least one slice by the number of physical data blocks allocated to the at least one slice.

19. The computing system of claim 15, wherein retiering the at least one physical data block of the one or more physical data blocks allocated to the at least one slice includes retiering a segment of physical data blocks from the storage object.

20. The computing system of claim 19, wherein retiering the segment of physical data blocks includes one or more of:

demoting the segment of physical data blocks from a first tier to a second tier, and promoting the segment of physical data blocks from the second tier to the first tier.

* * * * *